United States Patent [19]

McAllister et al.

[11] Patent Number: 5,130,342

[45] Date of Patent: Jul. 14, 1992

[54] PARTICLE-FILLED MICROPOROUS MATERIALS

[76] Inventors: Jerome W. McAllister; Kevin E. Kinzer; James S. Mrozinski; Eric J. Johnson, all of P.O. Box 33427, St. Paul, Minn. 55133

[21] Appl. No.: 558,245

[22] Filed: Jul. 25, 1990

Related U.S. Application Data

[63] Continuation of Ser. No. 258,314, Oct. 14, 1988, Pat. No. 4,957,943.

[51] Int. Cl.$^5$ ................................................ C08J 9/28
[52] U.S. Cl. ................................. 521/61; 428/315.5; 428/315.7; 521/64; 521/82; 521/91; 521/92; 523/136; 523/137
[58] Field of Search ................. 521/64, 61, 82, 91, 521/92; 428/315.5, 315.7

[56] References Cited

U.S. PATENT DOCUMENTS

| | | | |
|---|---|---|---|
| 2,947,646 | 8/1960 | Devaney et al. | 106/1.19 |
| 3,082,109 | 3/1963 | Devaney et al. | 106/1.19 |
| 3,351,495 | 11/1967 | Larsen et al. | 136/146 |
| 3,514,607 | 5/1970 | Webster | 250/108 |
| 3,745,142 | 7/1973 | Mahlman | 260/41 |
| 3,870,593 | 3/1975 | Elton et al. | 428/315.5 |
| 4,247,498 | 1/1980 | Castro | 264/41 |
| 4,342,811 | 8/1982 | Lopatin et al. | 428/220 |
| 4,485,838 | 12/1984 | Shoji et al. | 164/462 |
| 4,539,256 | 9/1985 | Shipman | 428/315.5 |
| 4,550,123 | 10/1985 | Lopatin et al. | 321/64 |
| 4,562,108 | 12/1985 | Miyake et al. | 428/212 |
| 4,619,963 | 10/1986 | Shoji et al. | 524/439 |
| 4,650,730 | 3/1987 | Lundquist et al. | 429/62 |
| 4,726,989 | 2/1988 | Mrozinski et al. | 429/315.5 |
| 4,867,881 | 9/1984 | Kinzer | 428/315.7 |
| 5,035,886 | 7/1991 | Chakrabarti et al. | 521/61 |
| 5,071,645 | 12/1991 | Johnson et al. | 521/64 |

FOREIGN PATENT DOCUMENTS

| | | |
|---|---|---|
| 0177777 | 4/1986 | European Pat. Off. . |
| 0202554 | 11/1986 | European Pat. Off. . |
| 51-74057 | 6/1976 | Japan . |
| 1100497 | 1/1968 | United Kingdom . |
| 1113349 | 5/1968 | United Kingdom . |
| 1327602 | 8/1973 | United Kingdom . |

OTHER PUBLICATIONS

M. C. Williams et al. Fricki "Phase Separation Spinning of Polypropilene," SPE Journal 28, Oct. 1972, p. 51.
D. Bennett: Nonwovens World, 2, Nov. 1987, p. 58.
Smolders & Steenberger: Kolloid-Z.U.Z. Polymere 243, 14–20 (1971).

*Primary Examiner*—Veronica P. Hoke
*Attorney, Agent, or Firm*—Gary L. Griswold; Walter N. Kirn; Carole Truesdale

[57] ABSTRACT

A microporous particulate-filled thermoplastic polymeric article is provided. The article can be in the form of a film, a fiber, or a tube. The article has a thermoplastic polymeric structure having a plurality of interconnected passageways to provide a network of communicating pores. The microporous structure contains discrete submicron or low micron-sized particulate filler, the particulate filler being substantially non-agglomerated.

30 Claims, 2 Drawing Sheets

PARTICLE-FILLED MICROPOROUS MATERIALS

The Government of the United States has rights in this invention pursuant to Subcontract No. 6678305 awarded by the Department of Energy.

This is a continuation of application Ser. No. 07/258,314 filed Oct. 14, 1988, now U.S. Pat. No. 4,957,943.

FIELD OF THE INVENTION

The present invention relates to particle-filled microporous materials such as films and fibers, a method for preparing same and articles prepared therefrom.

BACKGROUND OF THE INVENTION

It has been common practice to use fillers in polymers to produce a large variety of articles. Such articles contain a range of fillers such as, for example, highly stable and color-fast pigments, activated carbon sorbents, ion exchange resins, and fine silver particles for photographic films.

U.S. Pat. No. 2,947,646 (Devaney et al.) discloses colloidal dispersions of metals in plastics which are prepared by depositing a thin coating of metal onto finely powdered plastic, working the metal-coated plastic powder into a plastic state, the working resulting in fragmentation of the metal coating into very small metallic particles, and fabricating into the final shape.

U S. Pat. No. 3,082,109 (Devaney et al.) discloses colloidal dispersions of metals in plastic which are prepared by incorporating into plastic metals which melt at or below the temperature of the metal rolls used for compounding the plastic material, compounding sufficiently to disperse the melted metals throughout the plastic, and fabricating into the final shape.

British Patent Specification No. 1,100,497 describes the production of polymer fibers from polymer solutions wherein a solution of the polymer is formed at an elevated temperature, below the decomposition temperature of the polymer, in at least one non-polymeric compound which dissolves the polymer at the elevated temperature and which does not dissolve the polymer at a lower temperature and the solution is extruded downwardly through a spinneret into unheated air which cools the solution to the lower temperature causing separation of the polymer from the solvent to form a fiber. The fiber may contain fillers such as sulfur, carbon black, or an ion exchange resin.

M. C. Williams and A. L. Fricke, "Phase Separation Spinning of Polypropylene," *SPE Journal*, 28, Oct. 1972, p. 51, describe a method of making porous fibers by spinning a hot solution of polypropylene in naphthalene, allowing the spun solution to cool to solidify the fiber and effect phase separation of polypropylene and naphthalene, and removing the naphthalene by extraction with diethyl ether. Williams and Fricke suggest that this technique could possibly be used to produce fibers with high filler contents by mixing solid fillers into the spinning solution.

U.S. Pat. No. 3,351,495 (Larsen et al.) discloses a battery separator comprising a microporous sheet of a specified polyolefin. The battery separator, which preferably contains a homogeneous mixture of 8 to 100 volume percent of polyolefin, 0 to 40 volume percent plasticizer, and 0 to 92 volume percent inert filler material, is prepared by blending the components and then fluxing the blend in a conventional mixer such as a Banbury mixer or melt homogenizing the blend in a conventional two roll mill, forming the composition into sheet form, and extracting at least a portion of the inert filler and/or plasticizer.

U.S. Pat. No. 4,650,730 (Lundquist et al.) describes a battery separator having at least two plies, each in the form of a microporous sheet, at least one ply, formed from a polymeric composition comprising a polymer and, optionally, plasticizers, stabilizers, antioxidants, and the like but substantially no particulate filler and being capable of transforming to a substantially nonporous membrane at a temperature between about 80° and 150° C., and at least one ply, formed from a polymeric composition comprising a polymer and, optionally, plasticizers, stabilizers, antioxidants, and the like and preferably contains a large amount (greater than 20) weight percentage of solid, particulate filler.

U.S. Pat. No. 3,745,142 (Mahlman et al.) describes a process for preparing highly filled polyolefins which comprises preparing a crystallizable olefin polymer having a specified particle size, adding to the olefin polymer about 50 to 1900%, based on the weight of olefin polymer of a solid, particulate, inorganic filler material which is insoluble in the olefin, which is solid at the melting point of the olefin polymer and which is in the form of particles of about 0.1 to 25 microns, shaping the resultant polymer-filler blend, and fusing the olefin polymer to from a continuous phase. The highly filled compositions can be prepared simply by adding the particulate inorganic filler directly into a dispersion, either aqueous or organic, of the olefin polymer and agitating to make the total dispersion uniform.

British Patent Specification No. 1,327,602 (Hercules) describes a process for preparing filled olefin polymers containing about 35 to 90% by weight of a particulate, inert, inorganic filler comprising extruding a substantially homogeneous mixture of polymer, filler and 25 to 75% by weight of the homogeneous mixture of hydrocarbon wax, which acts as a low viscosity diluent for the polymer, to form a shaped structure, cooling the extruded blend to form a continuous polymer phase, extracting the wax, and recovering the filled structure in the shape desired.

U.S. Pat. Nos. 4,342,811 and No. 4,550,123 (Lopatin et al.) describe open-celled microporous sorbent-loaded textile fibers and films prepared by forming a melt blend, of the sorbent particles, the polymer and a selected diluent, e.g., in a batch-type blender such as a Sigma blade mixer or blending extruder such as a twin-screw compounding extruder, spinning or extruding and drawing down the fiber or film, and extracting the diluent.

U.S. Pat. No. 4,562,108 (Miyake et al.) describes a heat-retaining moisture-transmissible water-resistant fabric having a fibrous substrate, a discontinuous polymer layer or a polymer layer having a multiplicity of interconnecting fine pores, and a polymer layer containing 15 to 70 weight percent, based on the weight of the polymer, of heat ray-reflecting fine metal pieces and having interconnecting fine pores. Alternatively, a specified microporous film layer may be interposed between the polymer layers. The metal-containing layer is prepared by solvent casting the polymer after simple mixing with an aluminum paste.

In addition it has been known for a long time to use dyes and pigments in polymers for coloration. Products made using this art use commercially available pigment dispersions to avoid pigment agglomeration and the articles formed are usually of non- porous polymers. See D. Bennett, Nonwoven World, 2, Nov. 1987, p. 58.

Metal or metal oxide filled polymeric fabrics for X-ray absorption have been widely used to construct personal protective garments for a number of years. U.S. Pat. No. 3,514,607 describes composite shields against low energy X-rays which are sheets of a carrier material containing tin, antimony, iodine, barium, or a combination thereof and lead. The carrier material may be flexible, e.g., a plastic or rubber material, or rigid, e.g., a plastic or a building material. The minimum content of carrier material needed to yield materials with acceptable mechanical strength is 16% by weight.

U.S. Pat. Nos. 4,619,963 and No. 4,485,838 (Shoji et al.) describe a radiation shielding composite sheet material of melt-spun lead fibers of more than 99% purity, and containing 50 to 500 ppm tin, of a mean length of 0.5 to 1.3 mm which are embedded in a synthetic resin, such that the composite sheet has a specific gravity greater than 4.0. The sheet material can be formed by melt-spinning the tin-containing lead fibers at a diameter below 60 microns, cutting the fibers to a length of 0.5 to 1.3 mm in length, blending the fibers with a thermoplastic resin, e.g., in a Banbury mixer, and pressing the blend between rolls to form a sheet. Efficacy data is given comparing these constructions to powder filled composites made by the same process. The powder filled composites can be made with up to 75 weight percent lead and can absorb X-rays up to 60 percent as well as crystalline lead foil. The fiber filled composites can be made with up to 85 weight percent lead and absorb with 80 percent the efficiency of lead foil. Lead filler levels of 75 and 85 weight percent are 23 and 35 volume percent respectively.

U.S. Pat. No. 4,247,498 (Castro) discloses microporous polymers characterized by a relatively homogeneous, three-dimensional cellular structure having cells connected by pores of smaller dimension. The microporous polymers are prepared from thermoplastic polymers by heating a mixture of the polymer and a compatible liquid to form a homogeneous solution, cooling the solution under non-equilibrium thermodynamic conditions to initiate liquid-liquid phase separation, and continuing the cooling until the mixture achieves substantial handling strength.

U.S Pat. No. 4,539,256 (Shipman) discloses a microporous sheet material characterized by a multiplicity of spaced randomly dispersed, equiaxed, non-uniform shaped particles of the thermoplastic polymer, adjacent thermoplastic particles connected to each other by a plurality of fibrils of the thermoplastic polymer. The sheet materials are prepared by melt blending crystallizable thermoplastic polymer with a compound which is miscible with the thermoplastic polymer at the melting temperature of the polymer but phase separates on cooling at or below the crystallization temperature of the polymer, forming a shaped article of the melt blend, cooling the shaped article to a temperature at which the polymer crystallizes to cause phase separation to occur between the thermoplastic polymer and the compound.

U.S. Pat. No. 4,726,989 (Mrozinski) discloses microporous materials incorporating a nucleating agent made by melt blending a crystallizable thermoplastic polymer with a nucleating agent which is capable of inducing subsequent crystallization of the thermoplastic polymer and with a compound which is miscible with the thermoplastic polymer at the melting temperature of the polymer but phase separates on cooling at or below the crystallization temperature of the polymer, forming a shaped article of the melt blend, cooling the shaped article to a temperature at which the nucleating agent induces the thermoplastic polymer to crystallize so as to cause phase separation to occur between the thermoplastic polymer and the compound.

SUMMARY OF THE INVENTION

The present invention, in one aspect provides a microporous particulate-filled thermoplastic polymeric article which comprises a thermoplastic polymeric structure having a plurality of interconnected passageways to provide a network of communicating pores, the microporous structure containing discrete submicron or low micron-sized particulate filler, the particulate filler being substantially non-agglomerated.

The thermoplastic polymeric structure may be substantially homogeneous throughout or the porosity of the structure may be gradient therethrough. The particulate filler may be substantially uniformly distributed throughout the article or the particulate filler may have a gradient density throughout the article.

The microporous particulate-filled articles may be provided as, for example, films, fibers, hollow fibers, and tubes. When the structure is in the form of a film, the film may be uniaxially or biaxially oriented. When the structure is in the form of a fiber, hollow fiber or tube, it may also be oriented. The articles of the invention have a network of interconnected passageways to provide communicating pores, with high effective pore size range, low fluid flow resistance, broad pore size control and with up to 50 or more volume percent filler loading.

The present invention, in a further aspect, provides a microporous particulate-filled thermoplastic polymeric filtration media comprising a thermoplastic polymeric structure having a plurality of interconnected passageways to provide a network of communicating pores, the microporous structure containing discrete submicron or low micron-sized particulate filler, the particulate filler being substantially non-agglomerated.

The present invention, in another aspect, provides a protective garment comprising a microporous particulate-filled thermoplastic polymeric fabric, the fabric comprising a thermoplastic polymeric structure having a plurality of interconnected passageways to provide a network of communicating pores, the microporous structure containing discrete submicron or low micron-sized particulate filler, the particulate filler being substantially non-agglomerated. The microporous particulate-filled thermoplastic polymeric material may be bonded or laminated to a film, a woven, knitted, or nonwoven fabric or scrim to provide additional structural stability and durability.

The present invention, in a further aspect, provides X-ray shielding material comprising a thermoplastic polymeric structure having a plurality of interconnected passageways to provide a network of communicating pores, the microporous structure containing discrete submicron or low micron-sized heavy metal X-ray absorbing particulate filler, the particulate filler being substantially non-agglomerated. Surprisingly, even when the densities of the X-ray shielding material of the invention are less than 0.5 percent of those of the heavy metal shielding, the materials of the invention are as efficient as a foil of the crystalline metal on a comparable weight per area basis.

The present invention, in a further aspect, provides electromagnetic shielding material comprising a thermoplastic polymeric structure having a plurality of interconnected passageways to provide a network of communicating pores, the microporous structure containing discrete submicron or low micron-sized heavy metal electromagnetic absorbing particulate filler, the particulate filler being substantially non-agglomerated. The particulate filler preferably absorbs electromagnetic waves having frequencies in the range of microwaves to X-rays.

The present invention, in a further aspect, relates to a method for preparing a particulate-filled microporous thermoplastic polymeric shaped article which comprises the steps of a) dispersing submicron or micron-sized particulate filler in a liquid compatible with the thermoplastic polymer to form a colloidal suspension of the particulate filler in the liquid, the particulate filler being substantially non-agglomerated;

b) melt-blending the thermoplastic polymer with a solubilizing amount of the compatible liquid containing the dispersed particulate filler at a temperature sufficient to form a homogeneous solution;

c) forming an article from the solution;

d) cooling the shaped article at a rate and to a temperature sufficient to initiate thermodynamic, non-equilibrium phase separation;

e) further cooling the article to solidify the thermoplastic polymer; and f) removing at least a substantial portion of the compatible liquid with the particulate filler remaining substantially entirely within the thermoplastic polymer article.

The article can optionally be oriented after solidification of the thermoplastic polymer, step e, or after removal of the compatible liquid, step f. The process of the invention enables large volumes of filler to be effectively introduced into the article with relatively large volumes of the compatible liquid without loss of mechanical properties since the compatible liquid is not present in the final article and the removal of the compatible liquid is accomplished without substantial removal of the filler from the article.

The thermodynamic, non-equilibrium phase separation may be either liquid-liquid phase separation or liquid-solid phase separation.

When liquid-liquid phase separation occurs, the cells comprise void spaces encased by fibrous, lacy, or semi-continuous boundaries with the filler particles attached thereto. Upon orientation, the cells become elongated in the direction of orientation. The cells of the oriented article are generally ellipsoidal in shape with an aspect ratio of major axis to minor axis greater than 1.0 and a major axis generally lying in a plane parallel to the surface of the article. The filled particles reside in and are attached to the thermoplastic polymer of the formed structure.

When liquid-solid phase separation occurs, the material has an internal structure characterized by a multiplicity of spaced, randomly disposed, non-uniform shaped, equiaxed particles of thermoplastic polymer, adjacent particles throughout said material being separated from one another to provide the material with a network of interconnected micropores and being connected to each other by a plurality of fibrils consisting of the thermoplastic polymer. The fibrils elongate upon orientation providing greater spacing between the thermoplastic polymer particles and increased porosity. Again, the filled particles reside in and are attached to the thermoplastic polymer of the formed structure.

DETAILED DESCRIPTION OF THE INVENTION

As used herein, the term "thermoplastic polymer" refers only to conventional polymers, both crystalline and non-crystalline, which are melt processable under ordinary melt processing conditions and does not include polymers such as polytetrafluoroethylene which, only under extreme conditions, may be thermoplastic and melt processable.

As used herein, the term "crystalline", as used with regard to the thermoplastic polymer, includes polymers which are at least partially crystalline. Crystalline polymer structures in melt-processed thermoplastic polymers are well known.

As used herein, the term "amorphous", as used with regard to the thermoplastic polymer, includes polymers without substantial crystalline ordering such as, for example, polymethylmethacrylate, polysulfone, and atactic polystyrene.

As used herein, the term "melting temperature" refers to the temperature at which the thermoplastic polymer, in a blend of thermoplastic polymer and compatible liquid, will melt.

As used herein, the term "crystallization temperature" refers to the temperature at which the thermoplastic polymer, in a melt blend of thermoplastic polymer and compatible liquid, will crystallize.

As used herein, the term "equilibrium melting point", as used with regard to the thermoplastic polymer, refers to the commonly accepted melting point temperature of the thermoplastic polymer as found in published literature.

As used herein, "particle" refers to submicron or low micron-sized particles, also termed "particulate filler" herein, such particles having a major axis no larger than five microns.

As used herein, "discretely dispersed" or "colloidal suspension" means that the particles are arrayed substantially as individual particles with uniform spacings throughout a liquid or solid phase.

The submicron or low micron-sized particles useful in the present invention are capable of forming a colloidal dispersion with the compatible liquid and insoluble in the melt blend of the thermoplastic polymer and compatible liquid from which the articles of the invention are formed. The submicron or low micron-sized particles are preferably less than 5 microns in diameter, more preferably less than 3 microns in diameter, and most preferably less than about 1 micron in diameter. Useful particles include metals such as, for example, lead, platinum, tungsten, gold, bismuth, copper, and silver, metal oxides such as, for example, lead oxide, iron oxide, chrome oxide, titania, silica and aluminia, and blends thereof carbonaceous materials such as, for example, carbon black. Thermoplastic polymers useful in the present invention include olefinic, condensation and oxidation polymers. Representative olefinic polymers include high and low density polyethylene, polypropylene, polyvinyl-containing polymers, butadiene-containing polymers, acrylate containing polymers such as polymethyl methacrylate, and fluorine containing polymers such as polyvinylidene fluoride. Condensation polymers include polyesters such as polyethylene terephthalate and polybutylene terephthalate, polyamides such as nylon 6, nylon 11, nylon 13, and nylon 66, polycarbonates and polysulfones. Polyphenylene oxide is representative of the oxidation polymers which can be used. Blends of thermoplastic polymers may also be used.

The compatible liquid is a material which is capable of forming a solution with the thermoplastic polymer when heated above the melt temperature of the polymer and which phase separates from the polymer on cooling. The compatibility of the liquid with the polymer can be determined by heating the polymer and the liquid to form a clear homogeneous solution. If a solution of the polymer and the liquid cannot be formed at any liquid concentration, then the liquid is inappropriate for use with that polymer. In practice, the liquid used may include compounds which are solid at room temperature but liquid at the melt temperature of the polymer. Generally, for non-polar polymers, non-polar organic liquids with similar room temperature solubility parameters are generally useful at the solution temperatures. Similarly, polar organic liquids are generally useful with polar polymers. When blends of polymers are used, useful liquids are those which are compatible liquids for each of the polymers used. When the polymer is a block copolymer such as styrene-butadiene, the liquid selected must be compatible with each type of polymer block. Blends of two or more liquids can be used as the compatible liquid as long as the selected polymer is soluble in the liquid blend at the polymer melt temperature and the solution formed phase separates on cooling.

Various types of organic compounds have been found useful as the compatible liquid, including aliphatic and aromatic acids, aliphatic, aromatic and cyclic alcohols, aldehydes, primary and secondary amines, aromatic and ethoxylated amines, diamines, amides, esters and diesters, ethers, ketones and various hydrocarbons and heterocyclics. When the polymer selected is polypropylene, aliphatic hydrocarbons such as mineral oil, esters such as dibutyl phthalate and ethers such as dibenzyl ether are useful as the compatible liquid. When high density polyethylene is the polymer, an aliphatic hydrocarbon such as mineral oil or and aliphatic ketone such as methyl nonyl ketone or an ester such as dioctyl phthalate are useful as the compatible liquid. Compatible liquids for use with low density polyethylene include aliphatic acids such as decanoic acid and oleic acid or primary alcohols such as decyl alcohol. When the polymer is polyvinylidene fluoride, esters such as dibutyl phthalate are useful as the compatible liquid. When the polymer selected is nylon 11, esters such as propylene carbonate, ethylene carbonate, or tetramethylene sulfone are useful as the compatible liquid. When the polymer selected is polymethylmethacrylate, useful compatible liquids include, 1,4-butanediol and lauric acid. A compatible liquid for use with the polymer polyphenylene oxide is, for example, tallowamine.

The amount of filler particles in the thermoplastic polymer depends upon the amount of filler in the compatible liquid prior to melt blending and on the relative amount of thermoplastic polymer and compatible liquid in the blend. The amount does not depend upon liquid removal because the particles remain substantially entirely within the polymer structure. The amount of particles colloidally dispersed in the compatible liquid depends upon how well the particles are wet by the liquid, the surface area of the particles, and the proper choice of a dispersing aid or surfactant. Generally, for non-porous particles, a dispersion containing 40–50 volume percent particles can be achieved. The amount of filler in the polymer can be much greater than the amount of filler in the compatible liquid when the melt blend has a higher concentration of liquid than polymer.

The actual polymer concentration selected from within the predetermined concentration range for the liquid-polymer system being used is limited by functional considerations. The polymer concentration and molecular weight should be sufficient to provide the microporous structure which is formed on cooling with adequate strength for handling in further processing steps. The polymer concentration should be such that the viscosity of the liquid-polymer melt solution is suitable for the equipment used to shape the article. Generally, the polymer concentration in the compatible liquid is about 10 to 80 weight percent, which corresponds to a compatible liquid concentration of 20 to 90 weight percent. When high compatible liquid concentrations, i.e. 80 to 90 percent, are used in conjunction with high volume percent of filler in the compatible liquid, a very high, e.g., about 95 weight percent, concentration of the particulate filler in the thermoplastic polymer, relative to the liquid, can be achieved. For example, if the blend is 90:10 liquid/polymer by volume and the liquid is 40 percent particulate filler by volume, then the resulting filled microporous article is, surprisingly, 80 percent particulate filler by volume after the liquid is removed. That the particle-filled microporous thermoplastic polymeric articles of the invention can contain such large amounts of particulate filler is unexpected because it is believed that particle-filled thermoplastic articles made by standard extrusion processes achieve only about 20 percent filler by volume.

The relative amounts of thermoplastic polymer and compatible liquid vary with each system. The polymer concentration which can be used in a given system can be determined by reference to the temperature-composition graph for a polymer-liquid system as set forth in FIG. 1. Such graphs can be readily developed by known techniques such as set forth in Smolders, van Aartsen and Steenbergen, Kolloid-Z.u.Z. Polymere, 243,14–20 (1971).

Figure 1:
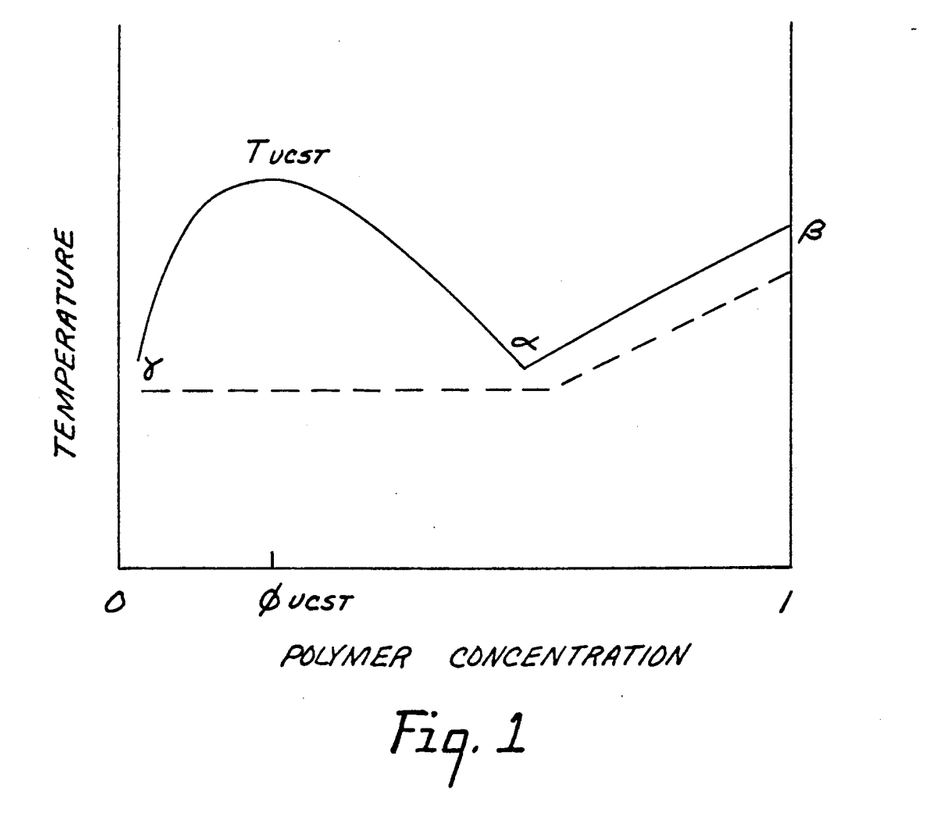
FIG. 1 is a temperature-composition plot for the thermoplastic polymer/compatible liquid systems of the invention.

The portion of the curve from gamma to alpha represents the thermodynamic equilibrium liquid-liquid phase separation. $T_{ucst}$ represents the upper critical solution temperature, i.e., the maximum temperature of the system at which liquid-liquid phase separation will occur. $\Phi_{ucst}$ represents the critical composition. To form the microporous polymers of the present invention, the polymer concentration utilized for a particular system must be greater than $\Phi_{ucst}$. If the polymer concentration is less than this, the phase separation which occurs as the system is cooled forms a continuous liquid phase with a discontinuous polymer phase, resulting in a structure which lacks sufficient integrity.

The portion of the curve from alpha to beta represents equilibrium liquid-solid phase separation. Alternatively, the compatible liquid can be chosen such that the thermoplastic polymer and compatible liquid system will exhibit liquid-solid phase separation or liquid-liquid phase separation over the entire composition range. For a given cooling rate in a system, the crystallization temperature-concentration curve of the compatible liquid can be determined and from this curve the concentration ranges for the polymer and the liquid which will yield the desired microporous structure at the given cooling rate can be determined. The determination of the crystallization curve is an alternative to determining the temperature-concentration phase diagram for a system incorporating a semicrystalline polymer.

In the process of the present invention, the rate of cooling of the solution may be varied within wide limits as long as the rate is sufficient that the phase separation does not occur under thermodynamic equilibrium conditions. For many liquid-polymer systems, when the rate of cooling of the liquid-polymer solution is slow, but sufficient to result in liquid-liquid phase separation, liquid-liquid phase separation occurs at substantially the same time as the formation of a plurality of liquid droplets of substantially uniform size. When the cooling rate is such that the droplets form, the resultant microporous polymer will have a cellular microstructure. If the rate of cooling of the liquid-polymer solution is rapid, the solution undergoes a spontaneous transformation called spinodal decomposition, the resultant microporous polymer will have a fine open-cellular microstructure. The fine microporous structure is referred to as a lacy structure. For many polymer systems which include a crystalline polymer, when the rate of cooling is sufficient to result in liquid-solid phase separation, the resulting microporous polymer will have spherulitic microstructure. Thus, differing microporous structures can be obtained by either liquid-liquid or liquid-solid phase separation techniques by varying the cooling rate and the liquid-polymer system used.

In the microporous structures of the invention, the particulate filler is uniformly and discretely arrayed in the structure. For example, when the structure is spherulitic, particles are in both the spherulites and in the fibrils between them. Although the particles are firmly held in the polymeric structure, they are substantially exposed after liquid removal. In a structure, the distribution of particles is uniform wherever the polymer phase occurs. The particles substantially exist as individual, and not agglomerated, particles throughout the microporous structure. Agglomerates of 3 to 4 particles may occur, but their frequency is no more than in the compatible liquid dispersion prior to melt blending with the polymer. The average particle spacing depends upon the volume loading of the particle in the polymer.

The compatible liquid is removed from the material to yield a particle-filled, substantially liquid-free, microporous thermoplastic polymeric material. The compatible liquid may be removed by, for example, solvent extraction, volatilization, or any other convenient method, and the particle phase remains entrapped to a level of at least about 90 percent, more preferably 95 percent, most preferably 99 percent, in the microporous polymer structure.

The particle-filled microporous structures of this invention can be oriented, i.e., stretched beyond their elastic limit to introduce permanent set or elongation and to ensure that the micropores are permanently developed or formed. Orientation can be carried out either before or after removal of the compatible liquid. This orientation of the structures aids in controlling pore size and enhances the porosity and the mechanical properties of the material without changing the particle uniformity and degree of agglomeration in the polymer phase. Orientation causes the microporous structure to expand such that the porosity increases.

Orientation of films of the invention can be used as a process variable to control thickness and relatively thin microporous films can be produced. Thickness is particularly important for microporous film applications where selective fluid transport through the microporous film is desired, since the rate of transport is inversely proportional to the thickness. Decreasing thickness minimizes the hydrostatic resistance to flow through the film. Orientation enables production of thin films with minimal difficulty. Orientation also enhances the mechanical strength of the films which is beneficial in many microporous film applications. With increasing orientation, film thickness and resistance to flow are proportionately reduced, mechanical strength and porosity are proportionately increased, and the pore size range is extended with improved pore size control, so that an excellent balance of desired properties can be attained through selection of the amount of orientation to which the microporous film is subjected.

Particle-filled microporous films of the invention may be uniaxially or biaxially oriented. Preferably, the particle-filled microporous films are stretched at least about 10 percent, more preferably about 10 to 1000 percent. The actual amount of stretching required is dependent upon the particular composition of the article and the degree of porosity desired. Stretching of the structure is preferably uniform so that the oriented structure has uniform, controlled porosity. When the structures are uniaxially oriented, narrowing of the structure in the non-oriented direction generally occurs, such that stretching the film for example, a film, 50 percent does not result in a 50 percent increase in surface area, but something less than a 50 percent increase. Particle-filled microporous tubular film can be oriented, for example, using conventional film stretching devices as well as by inflating the tubular film during the extrusion process thereby reducing film thickness and expanding film dimensions radially. Particle-filled microporous fibers can be oriented, or example, by stretching the fibers in a lengthwise direction between a set of rolls with increasing speeds from 10 to 1000 percent before or after removal of the compatible liquid. The orientation is preferably dimensionally stabilized in the material using well-known techniques such as, for example, heating the material to a stabilizing temperature under restraint. The presence of filler particles has little measurable effect on the orientation process or on the mechanical properties of the resulting oriented article.

After removal of the compatible liquid and, optionally, orientation, the resulting particle-filled microporous material may be modified by imbibition of various materials, such as, for example, liquids, solvent solutions, solvent dispersions, or solids. Such materials may be imbibed by any of a number of known methods which result in the deposition of such materials within the porous structure of the microporous material. The imbibed material may be physically entrapped within the microporous structure, chemically reacted with the polymeric material of the microporous structure, or attached to the particulate filler contained within the microporous structure. Examples of imbibing materials include medicaments, fragrances, antistatic agents, surfactants, and pesticides. The thermoplastic polymer may be imbibed with a urethane monomer which is then polymerized in place to provide a liquid-impermeable, vapor-permeable material.

The particle-filled microporous material of the invention may be further modified, either before or after removal of the compatible liquid, by depositing various materials on the surface thereof using known coating or deposition techniques. For example, the particle-filled microporous material may be coated with metal by vapor deposition or sputtering techniques or by materials such as adhesives, aqueous or solvent-based compositions, and dyes. Coating can be accomplished by such conventional coating techniques as, for example, roller coating, spray coating, dip coating, and the like.

Particle-filled microporous sheet materials of the invention may be laminated to various other materials such as, for example, woven, knitted, or non-woven fabrics, films, or to one or more additional layers of similar or other microporous sheet material to achieve, for example, desired thicknesses, porosity gradients, handling properties, and aesthetics. Lamination can be carried out using conventional techniques such as adhesive bonding, spot welding, or other techniques which do not undesirably interfere with the porosity or create undesirable porosity of perforations.

When particle-filled porous films of the present invention are prepared using a polyolefin as the thermoplastic polymer, a preferred method of producing multi-layered laminates results in a composite film that has high surface to surface bond strength of the laminates, and no interruptions of the porosity at the layer interfaces. The process used to form these multi-layered filled microporous polyolefin sheets takes place before stretching the polyolefin sheets and includes solvent exchanging the aforementioned compatible liquid used for the particle filled microporous film formation, for a volatile solvent, then placing these wet sheets of polyolefin in intimate contact with each other, drying to remove the solvent and then stretching in one or more directions. Alternatively, the particle filled polyolefin sheets with the compatible liquid still in place, may be laid-up and placed in intimate contact with each other, the liquid removed by solvent extraction with drying of the solvent, and then stretched in one or more directions.

The particle-filled microporous material of the invention may be modified to produce a porous membrane having a gradient porosity therethrough, if the extruded film is rapidly cooled from one surface thereof immediately after extrusion, such as by bringing the surface into contact with a chilled casting wheel. The surface of the film in contact with, for example, the chilled casting wheel can be fused or sealed, while the opposite side remains porous. Orientation of this gradient porosity structure enhances the porosity differences from surface to surface. Films with such properties can be used, for example, for microfiltration or ultrafiltration or as protective films or tapes, having, for example, the porous side readily markable and the sealed side resistant to marking.

The particle-filled microporous materials of the invention are useful in a variety of applications where microporosity is desirable. For example, the microporous sheet materials can be used for ultrafiltration of colloidal matter, as filtering material for cleaning antibiotics, beer, oils, and bacteriological broths, and as diffusion barriers or separators in electrochemical cells. The microporous sheet material can also be used for sample collection in air analysis and for collection of microbiological specimens. When laminated to woven scrim material, the microporous materials can be useful for outerwear and for disposable protective garments for use, for example, in nuclear power plants, in hospitals, electronic clean rooms, or in areas where contact with hazardous chemicals or radiation can occur. The microporous sheet materials are also useful in surgical dressings, bandages, and other medical applications. In each of these applications the presence of a filler can enhance the performance of the material by adding either energy absorption or chemical reactivity.

The selection of the particulate filler is determined by the specific application for which the particle-filled microporous membrane is intended. The particles must be submicron or low-micron in size and are preferably chemically inert to the polymer and the compatible liquid. For example, tungsten and lead oxide are efficient absorbers of hazardous radiation; aluminum and ferrite particles are useful for absorbing microwave energy and converting the microwave energy to heat; certain transition metal oxides, such as chrome oxide, are useful for converting solar energy to heat; and fine silver particles are useful as antibacterial agents.

The particle-filled microporous materials of this invention are useful as an extremely low-density shielding material for X-rays when the particulate filler is heavy metal-containing X-ray absorbing particulate. Even when the densities of the X-ray absorbent particulate-filled microporous porous films of this invention are less than 0.5 percent of those of the heavy metal shielding, the materials of the invention are as efficient as a foil of the crystalline metal on a comparable weight per area basis. Such low density composites of heavy metal X-ray absorbers is very desirable for production of practical protective fabric or garments.

The X-ray absorption efficiency of the materials of this invention appear to be as high as that of the pure metal at the same basis weight. This 100 percent equivalency holds for extremely thin layers, about 0.01 mm or less. This means that composites with the same absorption but less weight than currently available can be made. The metal-filled microporous membranes are vapor-permeable which makes garments much more comfortable the wearer. The metal-filled porous membranes are soft, have a good hand, and are easily converted into garments even when the metal particle are present in high concentrations, e.g., 95 weight percent.

This surprising and unexpectedly high X-ray absorption efficiency of the particle-filled microporous articles of this invention is believed to be due to the discretely dispersed phase of colloidal-sized particles which are uniformly and discretely arrayed about the thermoplastic polymer phase. This degree of dispersion in the final article is a result of achieving a colloidal dispersion of the filler particles in the compatible liquid prior to melt-blending with the thermoplastic polymer.

In the first step of the process, the particulate filler, in powder form, is disposed beneath the surface of the compatible liquid and the entrained air is removed from the mixture. If this step is not spontaneous, a standard high speed shear mixer, such as made by Shar Inc., Fort Wayne, Ind., operating at several thousand RPM for about 60 minutes can be used to achieve this step.

The second, more difficult and more important, step of the process of this invention, is breaking down agglomerated particles to their primary particle size within the compatible liquid. This second step can be accomplished by milling, or grinding, the compatible liquid containing the particulate material. Two types of mills useful for this milling are, for example, attritors and sand mills.

A surfactant is preferably added to the mixture of compatible liquid and particulate filler to aid in dispersing the particulate filler in the compatible liquid and in maintaining the particulate filler as discrete particles. Anionic, cationic or nonionic surfactants can be used. Preferably, the surfactant is a low molecular weight polymer which stabilizes the dispersion by steric interaction between the particles or a small ionic molecule which stabilizes the dispersion by a charge mechanism. Preferably, the surfactant is present in an amount of about 1 to 40, more preferably 2 to 20, weight percent based on the weight of the particulate filler. Useful surfactants include OLOA 1200, a polyisobutene succinimide, available from Chevron Chemical Co., Houston, Tex., Wayfos TM TD-100, available from Phillip A. Hunt Chemical Co., East Providence, R.I., and Kr-55, available from Kenrich Petrochemicals, Bayonne, N.J.

Milling reduces agglomerates to primary particles but does not break down large particles to smaller particles. Therefore, filtration of the milled dispersion may be necessary, if large particles are present.

When a liquid containing particles is pulled or pushed through a filter, a complex flow system is set up in which little streams of liquid move from the bulk phase into and through the pores of the filter and out the other side. Liquid flows more readily through the larger pores, so that these pores are more likely to participate in the filtration process. Particles suspended in the liquid are carried along in the flowing liquid by inertia. If the particles are small enough to pass through the holes of the filter, they pass out the other side and become part of the filtrate. Otherwise, the particles become impinged upon the surface of the filter, or become trapped within the interstices of the filter matrix.

The following examples further illustrate this invention, but the particular materials and amounts thereof in these examples, as well as other conditions and details, should not be construed to unduly limit this invention. In the examples, all parts and percentages are by weight unless otherwise specified. Where stretch ratios are recited for extruded films, the first number indicates the stretch ratio in the machine direction (MD), i.e., extrusion direction, and the second number indicates the stretch ratio in the direction transverse to the extrusion direction (TD).

In all of the examples to follow, the particle/compatible liquid milling was carried out at a relatively high viscosity where the grinding, or milling, process is much more effective. A typical dispersion contained about 20 percent by volume of particles in compatible liquid, and typical viscosity values were 10 poise at 0.1 sec$^{-1}$ shear rate and 5 poise at 10 sec$^{-1}$ shear rate, as measured using a Rheometrics Fluid Rheometer Model 7800 under steady shear conditions. The grinding was carried out using an attritor or the sand mill.

For making small batch volume dispersions, an attritor Model 6TSG-1-4, manufactured by Igarashi Kikai Seizo Co. Ltd., Tokyo, Japan, was used. This attritor is a water-cooled vessel about 1 liter in volume which operates at about 1500 RPM. The capacity of such an attritor is about 500 cc of compatible liquid containing the particulate filler with a grinding media of about 300 cc of 1.3 mm diameter stainless steel balls.

For larger batches, a 0.5 gallon vertical sand mill manufactured by Schold Machine Co., St. Petersburg, Fla., was used. Typically, the sand mill would contain about 1300 cc of 1.3 mm stainless steel balls as grinding media and operate at about 3000 RPM. In the sand mill, the dispersion being made is continuously fed from the bottom and exited out the top by means of a gear pump. A typical recirculating rate for the 0.5 gallon sand mill is 3 gallons per hour.

Generally, in the attritor and in the sand mill, grinding times of 4 to 8 hours were required to achieve an adequate degree of dispersion, although, depending on the particulate used, grinding times of one hour or less are sufficient. The degree of dispersion was monitored by smearing a drop of the dispersion on a glass slide and viewing it with a laboratory microscope in a transmission mode at about 500 X. At this magnification, micron particles can be resolved visually. The dispersion was deemed adequate when 95 percent or more of the particles in the dispersion existed as primary particles, rather than agglomerates.

A surfactant was utilized during the dispersion step to reduce viscosity at the higher volume loadings and to stabilize the dispersion toward flocculation. The surfactant utilized in most of the examples that follow was OLOA 1200, a polyisobutene succinimide, available from Chevron Chemical Co., Houston, Tex. Surfactant levels were about 10 percent by volume of the particles. In addition to being an effective dispersing aid for a variety of particle/organic liquid combinations, it is thermally stable at the melt blend temperatures utilized herein.

In the examples that follow, it was necessary to filter the dispersions of particles in the compatible liquid to remove any large particles. A Model C3B4U 3 micron rope-wound filter made by Brunswick Technetics in Timonium, Md., was used just prior to melt-blending the dispersion with the thermoplastic polymer. The filtration step also removed hard agglomerates that had not been reduced by the milling to diameters less than 3 microns. This resulted in a more uniform finished article and allowed the dispersions to be metered under pressure by close tolerance gear pumps during the extrusion process without frequent breakdowns due to large particles clogging the pump. In all cases, less than 10 percent by weight of the dispersed particles was removed by this filtration step. After filtering, the concentration of particles in the compatible liquid was determined by measuring density with a Model DMA-4S Mettler/Paar density meter manufactured by Mettler Instrument Co. Hightsdown, N.J.

The following test methods were used in evaluating the various films:

Porosity (%)

The porosity is calculated according to the following formula:

$$\text{Porosity} = \left[1 - \frac{\text{bulk density}}{\text{polymer density}}\right] \times 100$$

where the bulk density is determined from measurement of specific gravity according to ASTM D-792.

Tensile Properties

Tensile strength (psi) and elongation (%) were measured according to ASTM D-882 using an Instron Model 1122, available from Instron Corp., Canton, Mass. under the following conditions:
jaw gap: 5 cm.
crosshead speed: 50 cm/min.
sample size: 2.5 cm wide.

Filler Concentration

Two different techniques were used in determining filler concentration in the examples.

Inductively Coupled Plasma Spectroscopy (ICP)

With this technique, the sample was solubilized in a suitable solvent at a known concentration. The sample solution was then aspirated into a Model 3580 inductively coupled plasma torch, available from Bausch and Lomb ARL, operating at 8000° to 10,000° C., which causes the atoms of the sample material to emit visible and ultraviolet radiation at wavelengths characteristic of the elements involved. The light intensity at each characteristic wavelength is directly proportional to the concentration of the source element in the sample solution being aspirated.

Differential Scanning Calorimetry (DSC)

In this technique, three scans (heat, cool, heat) are run on the material of interest and a control material produced under similar conditions but without the filler particles. The heat of fusion is determined for each of the scans and filler concentration calculated using the following equation:

$$X_{(filler)} = \frac{\Delta H_f(\text{control}) - \Delta H_f(\text{filled})}{\Delta H_f(\text{control})} (100)$$

where:
$X_{(filler)}$ = wt-% filler in the sample.
$\Delta H_f(\text{control})$ = heat of fusion of the control sample (cal/g).
$\Delta H_f(\text{filled})$ = heat of fusion of the filled sample (cal/g).

An average of the three scans is reported as the filler concentration.

Structural Examination

The microstructure of the particle filled microporous materials was examined using an ISI model Super-IIIA scanning electron microscope (SEM). The materials were prepared for SEM analysis by freeze fracturing under liquid nitrogen, mounting on SEM stubs, and vapor coating with approximately 150 to 200 angstroms of pure gold. The size and spacial distribution of the metal and metal oxide particles were determined by using back-scattered electron imaging with the SEM on uncoated materials. The resulting image is bright spots (resulting from the metal and/or metal oxide particles) on a dark background.

EXAMPLE 1

A mixture of 499 g of submicron tungsten powder, having an average particle size of about 0.5 micron, obtained from Union Carbide Corp., Danbury, Conn., 402 g white mineral oil having a density of 0.87 g/cc, and 20 g Wayfos ™ TD-100 surfactant, available from Phillip A. Hunt Chemical Corp., East Providence, R.I., was prepared. A dispersion of the tungsten powder in the mineral oil was achieved by milling with the Igarashi attritor for 6 hours, at 2000 RPM. Light microscopy at 300X showed a dispersion comprised of primary particles having a diameter of less than about 1 micron. This dispersion was diluted with additional mineral oil to a concentration of 5 weight percent tungsten and filtered using a 3 micron filter. Density measurements before and after filtering showed no significant loss of tungsten. The density of the dispersion was 0.93 g/cc.

High density polyethylene, HDPE, from American Hoechst, product number GM 9255, and the tungsten in mineral oil dispersion, were melt blended to form a homogeneous mixture at the ratio of HDPE to dispersion of 14.9:85.1 by volume. The blend was mixed and extruded using a 40 mm twin-screw extruder at an extrusion rate of 18 kg/hr, and extruder screw speed of 100 rpm, and a melt temperature of 160° C., through a film die having a slot 0.05 cm wide and 30.5 cm long. The extruded blend was cooled, by contacting a thermostated wheel maintained at 29° C. and rotating at 3 m/min to initiate thermodynamic, non-equilibrium liquid-solid phase separation and solidification of the film. The thickness of the film was 500 um.

The film was restrained in a frame and washed with 1,1,1-trichloroethane to remove the mineral oil. The effluent was clear indicating that substantially all of the tungsten particles remained with the polyethylene. The restrained, washed film was dried to remove any residual 1,1,1-trichloroethane. The dried film was oriented by stretching at a temperature of 93° C., a preheat time of about 1 minute, a stretch rate of 30 cm/min, and a stretch ratio of 3:1 in the machine direction and 3:1 in the transverse direction. While maintained at this stretch ratio, the oriented film was then heat set at a temperature of 100° C. The resulting tungsten-filled microporous polyethylene film was evaluated for tungsten concentration using a differential scanning calorimeter and for thickness and porosity. The results are set forth in Table 1.

TABLE 1

| | |
|---|---|
| Thickness (microns): | 103 |
| Porosity (%): | 95.3 |
| Tungsten content (%): | 17.2 |

Scanning Electron Microscopy, SEM, analysis at a magnification of 5000 X of the porous filled polyethylene film showed a spherulitic structure indicative of liquid-solid phase separation, with spherulite diameters of about 2 microns spaced 1 to 5 microns apart. Back scattered SEM analysis at a magnification of 2000 X showed that the tungsten particles were discretely dispersed in the polymer, with most particles smaller than 1 micron and none larger than 3 microns.

X-ray absorption efficiencies were measured using a Model Baltograph IV 80 Kev Bremstrahlung source from Balteau Electrical Corporation, Stamford, Conn. The efficiency of the tungsten filled porous films was compared to a 600 nanometer thick foil of crystalline tungsten made by sputter deposition onto polyimide film. An equal tungsten basis weight of the tungsten filled porous film was achieved by stacking 8 layers of the prepared film of this example. The X-ray absorption efficiencies are given in Table 2.

TABLE 2

| Sample | Tungsten Basis Weight (mg/cc) | Absorption Efficiency (%) |
| --- | --- | --- |
| 600 nm W foil | 1.16 | 17 |
| 8 layers W porous film | 1.11 | 22 |

Control experiments showed that the X-ray absorption contributions from the polyimide film in the foil sample and from the polyethylene in the 8 layers of porous film, were less than one percent. These results show that a small amount of sub-micron tungsten particles, dispersed throughout a volume 2000 times larger than an equivalent volume of crystalline tungsten foil, has an absorption efficiency equivalent to that of the foil. This, in turn, shows that the tungsten-filled microporous film of this example has an extremely uniform dispersed phase of sub-micron particles on a scale of the primary particle size, i.e., 1.0 micron.

EXAMPLE 2

Tungsten powder, 41.65 Kg, 0.8 to 1.0 micron, available from Teledyne Wah Chang, Huntsville, Ala., was mixed with 785 g OLOA surfactant, and 6.63 Kg mineral oil, and was milled for 10 hours at 3000 RPM using the 0.5 gallon vertical sand mill and filtered. The final density of the mixture was 4.02 g/cc. Porous high density polyethylene film was prepared as described in Example 1 using a melt blend volume ratio of 13.9:86.1 polymer to dispersion. The cast film was washed with 1,1,1-trichloroethane to remove the mineral oil, dried, and then biaxially oriented as described in Example 1. The film was characterized for thickness, porosity, and metal content, and the data is shown in Table 3.

TABLE 3

| Thickness (microns): | 210 |
| --- | --- |
| Porosity (%): | 92 |
| Metal content (%): | 95 |

Various multilayer laminates of films of this example were then made. Prior to orientation, the sheets of the cast film were solvent exchanged such that the mineral oil was replaced with 1,1,1-trichloroethane. The solvent exchanged sheets were then placed in intimate contact with each other, and dried to remove the 1,1,1-trichloroethane while being restrained rigidly at the periphery of the laminate. The laminates were then biaxially oriented as described in Example 1. Attempts to separate the layers of the porous material manually before or after biaxial orientation indicated the layers were bonded well and could not be separated. Porosity measurements indicated no interruptions of the porosity at the layer interfaces.

The 80 Kev Bremstrahlung source described in Example 1 was used to measure the X-ray absorption efficiency of a 6 layer laminate having a tungsten basis weight of 0.120 g/cm$^2$. The measured absorption efficiency was 99 percent. The 6-layer laminate had the same drape and hand as a single layer and, in fact, did not seem to be a laminate at all. This shows that a laminate, made without adhesive bonding, is a useful, lightweight, breathable fabric that is an efficient X-ray absorber.

Additional X-ray absorption characterization was done with an I-129 radio-isotope source. This source is monochromatic at 30 Kev. The absorption efficiency for a single layer of the film of this example with a basis weight of 20 mg/cm$^2$, was normalized to the number of layers (or basis weight) required to absorb 1 HVL (half value layer). 1 HVL is the amount of a given material required for 50 percent absorption efficiency. The measurement showed that the biaxially oriented, tungsten porous film of this example has a 1 HVL of I-129 absorption at a thickness of 1.5 laminates or 30 mg/cm$^2$. The Radiological Health Handbook, U.S. Department of Health Education and Welfare, Rockville, Md., Jan. 1970, gives I-129 HVL values for various metals and the value given for tungsten is 30 mg/cm$^2$. This basis weight of tungsten is equivalent to 0.015 mm of crystalline tungsten, therefore, the data shows that the filled porous film of this invention is as an efficient absorber as crystalline tungsten at extremely low thicknesses. For many applications involving radioactive materials in the workplace, protective garments supplying 5 HVL of absorption are necessary. This data shows that an 8 layer laminate of the material of this example will provide this, and thus is a practical radiation protection fabric.

EXAMPLE 3

Lead oxide (PbO) powder (litharge) with an average diameter of 1.5 microns was obtained from Hammond Lead Products, Hammond, Ind. A dispersion with a density of 2.42 g/cc was prepared by milling in the vertical sand mill for 8 hours, a mixture of 20.6 Kg PbO, 790 g OLOA, and 6.6 Kg mineral oil at 3000 RPM. A PbO-filled porous high density polyethylene film was prepared as in Example 2. Characterization data is given in Table 4.

TABLE 4

| Thickness (microns): | 175 |
| --- | --- |
| Porosity (%): | 94 |
| PbO content (%): | 93 |

A PbO content of 93 weight percent is a filler content of 57 volume percent, a remarkably high loading. The limiting factor on filler levels in many processes is the loss of mechanical properties at about the 20 volume percent level. This is is believed to be due to the filler particles not being sufficiently dispersed in the polymer. Although good dispersion in plasticizers are easily achieved, high plasticizer contents also tend to deteriorate mechanical properties. The strength of the process of this invention is that large volumes of filler can be introduced effectively with relatively large volumes of plasticizer, i.e., the compatible liquid, without loss of mechanical properties because the plasticizer is not present in the final article. Further, this removal is accomplished without substantial removal of the filler from the porous thermoplastic matrix.

Multilayer laminates of the biaxially oriented film were made and tested for X-ray absorption as described in Example 2. Using the 80 Kev Bremstrahlung source, a 9-layer sample containing 70 mg/cm$^2$ PbO showed an absorption efficiency of 97 percent. Using the 30 Kev monochromatic I-129 source, 1 HVL absorption was measured for a 4-layer laminate containing 31 mg/cm$^2$ of PbO.

EXAMPLE 4 AND COMPARATIVE EXAMPLE C1

In Example 4, a dispersion of tungsten particles, 0.8 to 1.0 micron diameter of Example 3, was prepared using 7.25 Kg of tungsten, 254 g OLOA surfactant, and 4.79

Kg mineral oil using the 0.5 gallon vertical sand mill operating at 3000 RPM for 7 hours. This mixture was diluted with mineral oil to a final density of 1.75 g/cc. Filled porous high density polyethylene film was extruded and cast as described in Example 1 using a melt blend volume ratio of 33:67 polymer to dispersion. After casting and cooling to effect liquid-solid phase separation and film solidification, the film was fed continuously into an extractor tank containing 1,1,1-trichloroethane to remove the mineral oil. The extraction tank was plumbed such that fresh 1,1,1-trichloroethane was continuously added and the 1,1,1-trichloroethane which was saturated with mineral oil was removed counter-current to the film. The next step in the continuous process was drying with forced air at a temperature of 88° C. Thereafter, the filled porous film was stretched first in the machine direction and then in transverse direction, both at a stretch ratio of 3:1. Machine direction stretching was at ambient temperature and the transverse direction stretching at a range of 79 to 101° C. Characterization data is given in Table 5.

TABLE 5

| Thickness (microns): | 59 |
| --- | --- |
| Porosity (%): | 84 |
| Tungsten content (%): | 71 |

Stacked layers of the biaxially oriented film were tested for X-ray absorption efficiency using the 80 Kev bremstrahlung source. A 44-layer stack containing 94 mg/cm² showed a 99 percent efficiency.

In Comparative Example C1, an unfilled porous film made in the same manner as in Example 4 except the dispersion volume was replaced with an equal volume of neat mineral oil. The thickness, density, and tensile properties were determined. The results are set forth in Table 6.

TABLE 6

|  | Example 4 | Comparative Example C1 |
| --- | --- | --- |
| Thickness (microns): | 59 | 42 |
| Density (g/cc): | 0.15 | 0.17 |
| Tensile strength (psi): |  |  |
| MD: | 2270 | 1980 |
| TD: | 705 | 1270 |
| Elongation (%): |  |  |
| MD: | 192 | 171 |
| TD: | 173 | 203 |

This data shows that a highly filled (71 percent tungsten) porous film has mechanical properties substantially equivalent to those of a comparable unfilled film.

COMPARATIVE EXAMPLE C2

An Ultra-Turrax Model SD-45 high speed shear mixer from Tekmar Co., Cincinnati, Ohio, was used to mix mineral oil containing 5 weight percent of 0.5 micron copper particles from Alfa Products, Danvers, Mass., for 1 hour at 100 percent power. Porous high density polyethylene film was prepared as in Example 1, with a melt blend ratio of 18.1:81.9 polymer to dispersion. The cast film was washed with 1,1,1-trichloroethane to remove the mineral oil and biaxially oriented as described in Example 1. Characterization data is given in Table 7.

TABLE 7

| Thickness Microns): | 150 |
| --- | --- |

TABLE 7-continued

| Porosity (%): | 95 |
| --- | --- |
| Copper content (%): | 16.5 |

Backscatter SEM was used to characterize the film at both 500 X and 2000 X. The results showed that most of the copper particles were in agglomerates of 5 to 10 microns in diameter and that the agglomerate distribution was non-uniform.

Figure 2:
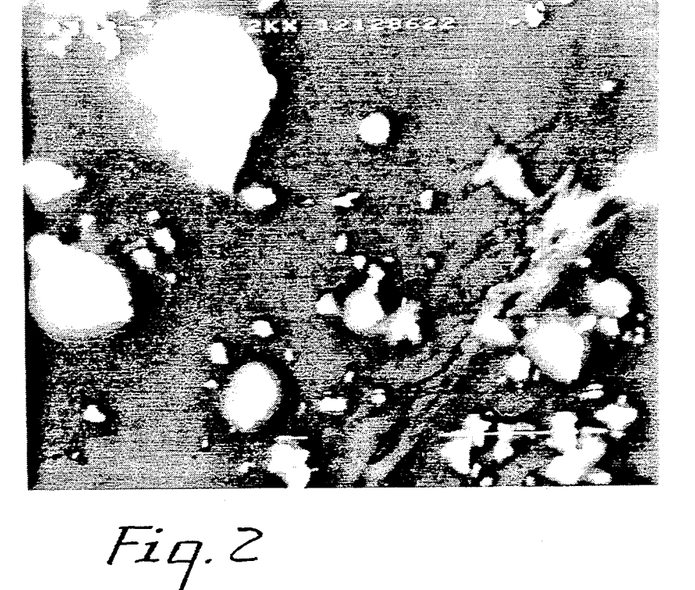
FIG. 2 is a photomicrograph at 2000 X of the prior art copper-filled microporous polyethylene film of Comparative Example 2.
Figure 3:
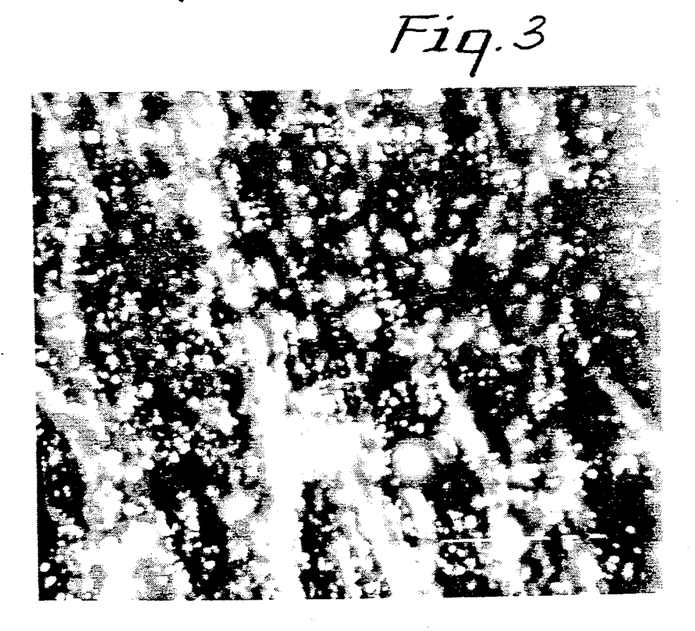
FIG. 3 is a photomicrograph at 2000 X of the tungsten-filled microporous polyethylene film of Example 1.

This data can be compared to the backscatter SEM data of the filled porous film of Example 1 wherein the film was made in the same manner as this example except the submicron particles were tungsten and were dispersively milled into the mineral oil. The 500 X and 2000 X SEM data of Example 1 shows that most of the tungsten occurs as primary particles about 1 micron in diameter or smaller and that these are uniformly dispersed within the polymer. There were a few agglomerates of tungsten containing 3 or 4 primary particles but these were no larger than 3 microns in diameter. Photomicrographs of the SEM data at 2000 X are shown in FIG. 2 for the copper of this example and in FIG. 3 for the tungsten of Example 1. The streaks in both photographs are artifacts produced by shadowing from the polyethylene matrix.

EXAMPLE 5

A mixture of 150 g tungsten powder (particle diameter 0.8 to 1.0 microns, available from Teledyne Wah Chang, Huntsville, Ala.), 360 g dibutyl phthalate, and 5.0 g OLOA surfactant was prepared. The dispersion was milled using the Igarashi attritor at 1800 rpm for 6 hours. A blend of 394 g polyvinylidene fluoride (Soltex 1011, available from Solvey, Inc.), and 394 g of the tungsten powder/dibutyl phthalate dispersion were batch mixed for 4 hours at 200° C. under a nitrogen atmosphere. The blend formed a homogeneous mixture which was pressed between plates heated to 200° C. to form a film approximately 0.6 mm thick which was quenched in a 5° C. water bath to initiate thermodynamic non-equilibrium solid-liquid phase separation and solidification.

The cast film was washed with 1,1,1-trichloroethane to remove the dibutyl phthalate and then oriented 1.5 × 1.25 at 135° C. The resulting tungsten-filled microporous polyvinylidene fluoride film was evaluated for thickness, porosity, and tungsten content and the results are set forth in Table 8.

TABLE 8

| Thickness (microns): | 530 |
| --- | --- |
| Porosity (%): | 47 |
| Tungsten content (%): | 26 |

EXAMPLE 6

A mixture of 150 g tungsten powder, (particle diameter 0.8 to 1.0 microns, obtained from Teledyne Wah Chang, Huntsville, Ala.), 360 g tallow amine (Armostat 310, available from Armak Chemical Co., Chicago, Ill.), and 5.2 g OLOA surfactant was prepared. The dispersion was milled using the Igarashi attritor at 1800 rpm for 6 hours. An additional 125 g of tallow amine was added to 402 g of the tungsten/tallow amine dispersion. A blend of 173 g polypropylene (Profax 6723, available from Himont, Inc.), and 517 g of diluted dispersion were batch mixed for 4 hours at 200° C. under a nitrogen atmosphere. The blend formed a homogeneous mixture which was pressed between plates heated to 180° C. to form a film approximately 0.6 mm thick which was quenched in a 5° C. water bath to initiate thermodynamic non-equilibrium liquid-liquid phase separation and solidification.

The cast film was washed with 1,1,1-trichlorethane to remove the tallow amine and then oriented 1.5×1 at 135° C. The resulting tungsten filled microporous polypropylene was evaluated for thickness, porosity, and tungsten content and the results are set forth in Table 9.

TABLE 9

| Thickness (microns): | 580 |
|---|---|
| Porosity (%): | 76 |
| Tungsten content (%): | 38 |

EXAMPLE 7

A mixture of 1350 g tungsten powder (particle size 0.8 to 1 micron, available from Teledyne Wah Chang, Huntsville, Ala.), 350 g mineral oil having a density of 0.87 g/cc, and 44 g OLOA 1200 surfactant was prepared. A dispersion of the tungsten powder in the mineral oil was achieved using the Igarashi attriter at 1800 rpm for 6 hours. 100 g of the dispersion was diluted with an additional 323 g of mineral oil. A blend of 138 g polypropylene (Profax TM 6723, available from Himont, Inc.), 0.35 g nucleating agent (Millad TM 3905, available from Milliken Chemical Co.) and 414 g of diluted dispersion were batch mixed for 4 hours at 200° C. under a nitrogen atmosphere. The blend formed a homogeneous mixture which was pressed between plates heated to 180° C. to form a film about 0.6 mm thick which was quenched in a 5° C. water bath.

The cast film was washed with 1,1,1-trichloroethane followed by isopropyl alcohol to remove the mineral oil. The resulting tungsten-filled microporous polypropylene film was evaluated for thickness, porosity, and tungsten content. The results are set forth in Table 10.

TABLE 10

| Thickness (microns): | 600 |
|---|---|
| Porosity (%): | 14.8 |
| Tungsten content (%): | 42.6 |

EXAMPLE 8

A mixture of 600 g tungsten powder (particle size 0.8 to 1 micron, available from Teledyne Wah Chang, Huntsville, Ala.), 300 g triethylene glycol, and 10.5 g OLOA 1200 surfactant was prepared. A dispersion of the tungsten powder in the triethylene glycol was achieved using the Igarashi attriter at 1800 rpm for 6 hours. A blend of 170.5 g nylon 6 (Nycoa TM 589, available from Nylon Corporation of America, Manchester, N.H.)), and 500 g of dispersion were batch mixed for 4 hours at 220° C. under a nitrogen atmosphere. The blend formed a homogeneous mixture which was pressed between plates heated to 220° C. to form a film about 1.2 mm thick which was quenched in a 5° C. water bath.

The cast film was washed with isopropyl alcohol to remove the triethylene glycol. The resulting tungsten-filled microporous nylon 6 film was evaluated for thickness, porosity, and tungsten content. The results are set forth in Table 11.

TABLE 11

| Thickness (microns): | 1200 |
|---|---|
| Porosity (%): | 14.8 |
| Tungsten content (%): | 58.2 |

Various modifications and alterations of this invention will be apparent to those skilled in the art without departing from the scope and spirit of this invention and this invention should not be restricted to that set forth herein for illustrative purposes.

What is claimed is:

1. A microporous particulate-filled thermoplastic polymeric article which comprises a thermoplastic polymeric structure having a plurality of interconnected passageways to provide a network of communicating pores, the microporous structure containing discrete submicron or low micron-sized particulate filler, the particulate filler being substantially non-agglomerated.

2. The article of claim 1 wherein said particulate filler has a major axis no larger than 5 microns.

3. The article of claim 1 wherein said particulate filler has a major axis no larger than 3 microns.

4. The article of claim 1 wherein said particulate filler has a major axis no larger than 1 micron.

5. The article of claim 1 wherein said particulate filler comprises up to about 95 weight percent of said article.

6. The article of claim 1 wherein said structure comprises void spaces encased by fibrous, lacy, or semi-continuous boundaries.

7. The article of claim 1 wherein said structure comprises a multiplicity of spaced, randomly disposed, non-uniform shaped, equiaxed particles of thermoplastic polymer, adjacent particles throughout said structure being separated from one another to provide the structure with a network of interconnected micropores and being connected to each other by a plurality of fibrils consisting of said thermoplastic polymer.

8. The article of claim 1 wherein said thermoplastic polymeric structure comprises an olefinic polymer, a condensation polymer, or an oxidation polymer.

9. The article of claim 8 wherein said olefinic polymer is high density polyethylene, low density polyethylene, polypropylene, polyvinyl-containing polymer, butadiene-containing polymer, or acrylate-containing polymer.

10. The article of claim 8 wherein said condensation polymer is polyester, polyamide, polycarbonate, of polysulfone.

11. The article of claim 8 wherein said oxidation polymer is polyphenylene oxide.

12. The article of claim 1 wherein said article is a film.

13. The article of claim 12 wherein said film is oriented in at least one direction.

14. The article of claim 1 wherein said article is a fiber.

15. The article of claim 14 wherein said fiber is oriented.

16. The article of claim 1 wherein said particulate filler is a metal, a metal oxide or a carbonaceous material.

17. The article of claim 16 wherein said metal is lead, platinum, tungsten, gold, bismuth, copper or silver.

18. The article of claim 16 wherein said metal oxide is lead oxide, iron oxide, chrome oxide, alumina, titania or silica.

19. The article of claim 16 wherein said carbonaceous material is carbon black.

20. The article of claim 1 wherein said structure has a uniform porosity therethrough.

21. The article of claim 1 wherein said structure has a gradient porosity therethrough.

22. The article of claim 1 wherein said particulate filler is substantially uniformly distributed throughout said structure.

23. The article of claim 12 wherein said article further comprises at least one layer of material laminated to said film.

24. The article of claim 23 wherein said material is a woven, knitted or nonwoven fabric, a film or an additional layer of said structure.

25. The article of claim 1 further comprising an imbibed material.

26. The article of claim 25 wherein said imbibed material is a medicament, a fragrance, an antistatic agent, a surfactant, or a pesticide.

27. A microporous particulate-filled thermoplastic polymeric filtration media comprising a thermoplastic polymeric structure having a plurality of interconnected passageways to provide a network of communicating pores, the microporous structure containing discrete submicron or low micron-sized particulate filler, the particulate filler being substantially non-agglomerated.

28. A protective garment comprising a microporous particulate-filled thermoplastic polymeric fabric, the fabric comprising a thermoplastic polymeric structure having a plurality of interconnected passageways to provide a network of communicating pores, the microporous structure containing discrete submicron or low micron-sized particulate filler, the particulate filler being substantially non-agglomerated.

29. X-ray shielding material comprising a thermoplastic polymeric structure having a plurality of interconnected passageways to provide a network of communicating pores, the microporous structure containing discrete submicron or low micron-sized heavy metal-containing X-ray absorbing particulate filler, the particulate filler being substantially non-agglomerated.

30. Electromagnetic shielding material comprising a thermoplastic polymeric structure having a plurality of interconnected passageways to provide a network of communicating pores, the microporous structure containing discrete submicron or low micron-sized heavy metal electromagnetic absorbing particulate filler, the particulate filler being substantially non-agglomerated.

* * * * *

UNITED STATES PATENT AND TRADEMARK OFFICE
CERTIFICATE OF CORRECTION

PATENT NO. : 5,130,342

DATED : July 14, 1992

INVENTOR(S) : Jerome W. McAllister, Kevin E. Kinzer, James S. Mrozinski, Eric J. Johnson and James F. Dyrud It is certified that error appears in the above-identified patent and that said Letters Patent is hereby corrected as shown below:

Title Page: [75] Inventors: should include -- James F. Dyrud --

Title Page: insert [73] Assignee: Minnesota Mining and Manufacturing Company, St. Paul, Minn.

Col. 1, line 6       insert at beginning of line -- under Contract W-7405-ENG-48, --

Col. 2, line 28      "from" should read -- form --

Col. 3, line 1       "non- porous" should read -- non-porous --

Col. 10, line 47     "or" should read -- for --

Col. 12, line 49     after "comfortable" insert -- for --

Col. 16, line 28     "1,1,1- trichloroethane" should read -- 1,1,1-trichloroethane --

Col. 18, line 10     "1970,gives" should read -- 1970, gives --

Col. 21, line 59     "N.H.))" should read -- N.H.) --

Signed and Sealed this

Twenty-sixth Day of October, 1993

Attest:

BRUCE LEHMAN

Attesting Officer         Commissioner of Patents and Trademarks